United States Patent [19]

Stancliffe et al.

[11] Patent Number: 4,762,581
[45] Date of Patent: Aug. 9, 1988

[54] METHOD OF MAKING HIGH-PROFILE STRUCTURES

[75] Inventors: Norman J. Stancliffe, Darwen; Frank B. Mercer; Cyril Kennerley, both of Blackburn, all of United Kingdom

[73] Assignee: Netlon Limited, Mill Hill, England

[21] Appl. No.: 845,966

[22] Filed: Mar. 31, 1986

[30] Foreign Application Priority Data

Apr. 2, 1985 [GB] United Kingdom ............... 8508562

[51] Int. Cl.$^4$ ............................................. B32B 31/26
[52] U.S. Cl. ........................................ 156/84; 156/85; 156/290; 28/156
[58] Field of Search ............... 156/84, 85, 210, 229, 156/290, 292; 28/156; 428/103, 152, 183, 190

[56] References Cited

U.S. PATENT DOCUMENTS

| | | | |
|---|---|---|---|
| 2,231,388 | 2/1941 | Kahil | 28/156 |
| 2,245,289 | 6/1941 | Müller | 156/85 |
| 2,401,828 | 6/1946 | Kahil | 28/74 |
| 2,401,830 | 6/1946 | Kahil | 28/77 |
| 2,607,104 | 8/1952 | Foster | 28/72 |
| 2,771,661 | 11/1956 | Foster | 28/80 |
| 2,977,664 | 4/1961 | Grajeck | 156/84 |

FOREIGN PATENT DOCUMENTS

| | | |
|---|---|---|
| 2855194 | 6/1980 | Fed. Rep. of Germany . |
| 3105882 | 9/1982 | Fed. Rep. of Germany . |
| 2205411 | 5/1974 | France . |
| 661074 | 11/1951 | United Kingdom . |
| 853697 | 11/1960 | United Kingdom . |

Primary Examiner—Caleb Weston
Attorney, Agent, or Firm—Holman & Stern

[57] ABSTRACT

A planar, biaxially heat-shrinkable, plastics mesh layer is fixed to a planar, relatively non-heat-shrinkable plastics mesh layer at zones which are spaced apart on a generally square grid, and the structure so formed is heated to cause the shrink layer to shrink biaxially and thereby cause the non-shrink layer to assume a cuspated configuration. The structure can be shipped as a semifinished product after fixing the layers together and before heating, thereby reducing bulk and hence shipping costs.

23 Claims, 2 Drawing Sheets

METHOD OF MAKING HIGH-PROFILE STRUCTURES

BACKGROUND OF THE INVENTION

The present invention relates generally to high-profile bulked multi-layer plastics material structures in which at least one layer is in a non-planar configuration. A high-profile structure has a thickness considerably greater than that of a bulked textile fabric. The thickness should in general be such as to be capable of restraining the movement of soil or gravel filling the reentrants in a profiled face of the structure when the structure is at a steep angle.

In a flexible form, such structures can be used for soil retention. The structure is placed on e.g. an embankment and may be filled with e.g. soil and grass seed. The grass seed grows and its roots entwine the structure, preventing gross erosion by heavy rainfall or the wave action of a river or sea. The structure itself can be pegged down to provide firm retention, at least in the initial stages of root growth.

A more rigid structure can for instance be used as a spacer for soil drainage, particularly when the compression resistance need not be too high. One or both faces of the structure would be provided with a layer of geofilter to prevent the structure filling with soil or silt and to maintain gaps within the structure through which water can drain.

It is desirable to be able to form high-profile structures which are dimensionally stable and fairly regular, in a quick and simple manner in a modern manufacturing plant. It is also desirable to develop a structure which does not have large through-channels which could lead to scouring in soil retention.

THE INVENTION

In the method of the invention, the shrink layer is biaxially heat-shrinkable, the second layer is of mesh structure, and the layers are fixed together at discrete zones which lie on the intersections of a notional, generally square grid, each zone being spaced from adjacent zones along each axis of the grid; on heating the shrink layer shrinks and the second layer bulks to form a high-profile, fairly regular cuspated configuration, i.e. having a face formed as an array of pyramid-like projections. Preferably the second layer (the non-shrink layer) does not shrink substantially, and it can be unorientated or alternatively orientated and then heat-set at a suitable temperature; however what is important is that the shrink layer should shrink much more than the non-shrink layer.

The use of a heat-shrinkable plastics material layer enables relatively high percentage shrinkages to be obtained and thus produces high-profile structures suitable for soil retention or soil drainage and more generally for geotechnical structures. It has been found that the mesh structure of the non-shrink layer enables the cuspated structures to be formed because the strands of the mesh structure can move relative to one another, e.g. a type of swivelling movement around the junctions or intersections of the strands of the structure as the non-shrink layer forms the cuspations.

In certain aspects, the invention is not limited to cuspated structures. Also the invention is not limited to having a biaxially heat-shrinkable shrink layer, or to having a mesh structure non-shrink layer. It has been appreciated that the steps of fixing the layers together and of heat shrinking can be performed at locations remote from each other, and even in different countries. After fixing the layers together, the structure is relatively dense and can be transported by public road, rail, sea or air in this semi-finished form, for instance as a roll. As significantly less air is being transported (compared to the bulked final product), a very high percentage of transportation costs can be saved. Thus the relatively dense structure can be formed into a roll which can be tied, strapped, packaged or containerised at the manufacturing site, transported a substantial distance (which would normally be tens or hundreds of kilometers), and then shrunk, for instance in a warehouse closer to the actual site of use. Though it is possible to have the shrink layer of imperforate material (such as plastics material film or plastic-coated aluminium foil), the layers are preferably all formed of mesh structure. The mesh structures may be integrally-extruded mesh structures, for instance formed in accordance with GB Nos. 836 555, 1 250 478, 1 264 629, SP No. 396 734 or GB No. 1 075 487 or pierced film; alternatively, the layers can be formed by weaving or knitting. A whole range of plastics materials can be used, for instance low, medium or high density polyethylene or polypropylene. Though it is possible to arrange for the heat shrinking to occur at relatively low temperature, it is preferred to carry this out at or very close to the boiling point of water as this provides simple temperature control and also avoids accidental heat shrinkage. Even higher temperatures can be used (utilising say hot air), in particular when the shrink layer is made from polypropylene or if higher shrinkages are required. Also, if the shrink layer is not powerful enough, it is an advantage to heat the non-shrink layer sufficiently to soften it and make it more easily deformable. The minimum heat shrinkage may be 5% and the maximum may be 50%, the amount of heat shrinkage depending upon the thickness required in the bulked structure.

The cuspated structures can be relatively strong as well as regular and dimensionally stable, being formed of individual layers each of which can be dimensionally stable. The cuspated structure can be made very quickly in a modern manufacturing plant. Cuspated structures have no large through-channels and can thus resist scouring when used for soil retention, but nonetheless have two directional drapability.

PREFERRED EMBODIMENTS

The invention will be further described, by way of example, with reference to the accompanying drawings, in which.

FIGS. 1 to 5

Figure 1:
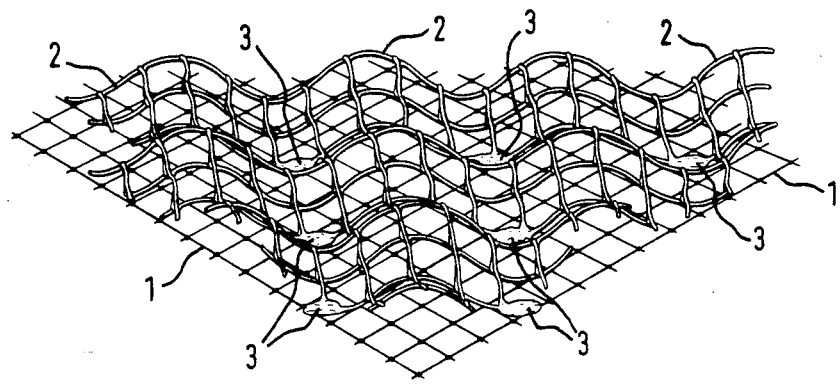
FIG. 1 is an isometric view of a cuspated structure.
Figure 4:
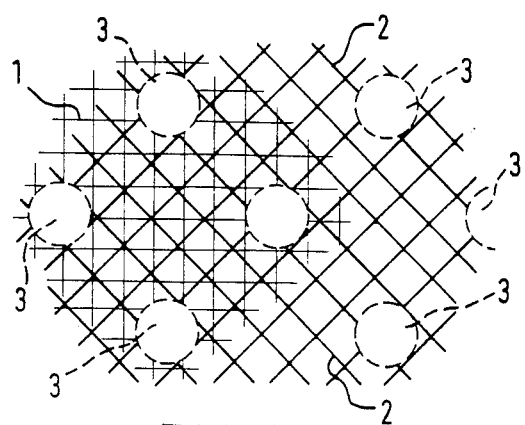
FIGS. 4 and 4a are alternate plan views of the structure of FIG. 1, primarily to show alternate heat-welding zones.
Figure 4A:
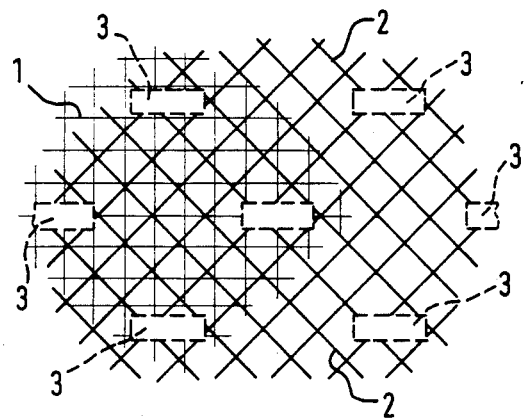
Figure 5:
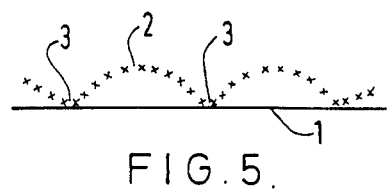
FIG. 5 is a schematic vertical section through another cuspated structure.

FIG. 1 shows a flat first layer 1 (shrink layer) and a cuspated second layer (non-shrink layer) 2. The layers are fixed together at discrete fixing zones 3 which lie on all the intersections of a notional, generally square grid, as shown in FIGS. 4 or 4a; each zone 3 is spaced from adjacent zones 3 along each axis of the grid; i.e. along each side of the square. The notional grid is not depicted in FIGS. 4 and 4a, but the sides of the grid run at 45° to the sheet of the drawing; the grid need not be precisely square, it only being necessary that the grid be generally or roughly square; i.e. one side could be rather larger than the other and/or the corner angles may be rather different from 90°. In FIGS. 4 and 4a, the machine direction (MD) will be up and down the sheet so that in the finished structure, the cuspate grid will be "on the diamond". This is preferred for enbankment stabilisation, though if the cuspated structure is used as a spacer, one could have the cuspated grid "on the square". Having the cuspated grid "on the square" can provide good drainage channels extending parallel to the run of the cuspated structure.

The material of the shrink layer 1 must be capable of biaxial heat shrinkage, and this is provided by stretching all the strands in ways which are already known, e.g. by bi-axial orientation of a formed mesh structure. Although it is the differential shrinkage that matters, it is highly desirable that the non-shrink layer 2 should not shrink very much during bulking up (but a shrinkage of say 2 or 3% may be acceptable). The non-shrink layer 2 can thus be of unorientated material, or can be of material which has been stretched and heat set at a temperature appreciably higher than the ultimate shrinking temperature.

Figure 3:
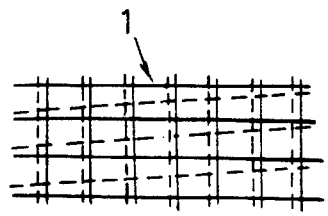
FIG. 3 is a plan view of the middle layer of the structure of FIG. 2.

Although it is possible to have the shrink layer 1 of imperforate plastics film, say 0.1 to 1 mm thick (FIG. 5), it is preferred that each layer should be formed of plastics mesh. This: lightens the structure; facilitates entanglement of roots when used for embankment stabilisation; allows the roots to penetrate into the ground below the structure; and allows rain or water to permeate through the soil or gravel retained by the structure and into the ground below. Though the layers 1, 2 can be knitted or woven, it is preferred that the strands should be firmly connected together at the junctions or knots, e.g. with integral strand junctions, as this gives a more dimensionally stable structure whilst allowing the movement required of the non-shrink layer 2 to form cuspated configuration—integrally or confluently extruded meshes are preferred. For the shrink layer 1, it is possible to use a mesh with the sides of the meshes generally parallel to the cuspate grid (i.e. a diamond mesh if the grid is "on the diamond"). However, as diamond meshes are relatively unstable dimensionally, it is preferred in manufacture to use a square or rectangular form, when the sides of the meshes would normally be substantially parallel to the diagonals of the cuspate grid. In addition, to form the shrink layer 1, it is preferred to overlay the mesh structures so that there are two plies, as illustrated in FIG. 3. Though separately produced mesh structures can be used, it is possible to fold over the mesh structure with a fold extending in the machine direction so that any one strand runs generally in the same direction in each ply (i.e. the MD strands continue to run in the MD direction and the transverse direction (TD) strands continue to run in the transverse direction). In practice, it is very expensive to provide mesh structures which are precisely accurate geometrically, though the MD strands are usually fairly parallel with the machine direction; the TD strands are not strictly at 90° to the machine direction, being at a small amount less than 90°, say at about 70° or about 80°; this causes irregular cuspation on heat shrinkage. By overlaying, the small amounts are fairly equal and in opposite directions so that the MD components of the transverse shrinkage forces of the TD strands of one ply are largely compensated for by the opposite MD components of those of the other ply and good cuspated structures can be achieved.

Although the shrink layer 1 can be less robust than the non-shrink layer 2, the shrink layer 1 must have enough strength and sufficient shrinkage to pull the non-shrink layer 2 into the type of cuspation required.

The material chosen for the shrink layer 1 will also depend upon the material chosen for the other layer(s). Though medium density polyethylene is one possible material, the preferred material is linear low density polyethylene for the shrink layer 1 in association with low, medium or high density polyethylene for the other layer(s). In an alternative, polypropylene can be used for the shrink layer 1 and the non-shrink layer 2 can be made of polyethylene, which softens at a lower temperature than polypropylene and will tend to enrobe the polypropylene during heat welding, giving good weld strength. Nonetheless, all the layers can be formed of the same material, if desired.

Figure 2:
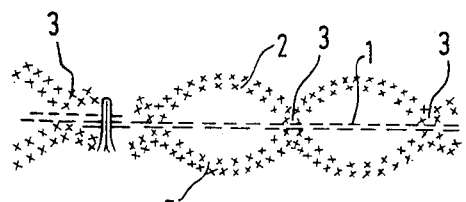
FIG. 2 is a schematic vertical section through a cuspated structure.

The non-shrink layer 2 can be in a single ply (as shown in FIG. 1) or of multi-ply construction (as shown in FIG. 2). It is found that one heavy ply is harder to cuspate than two lighter plies, and the two plies also provide more filaments for the entanglement of roots in an embankment stabilisation application. It is preferred that the non-shrink layer 2 should be of square or rectangular form mesh structure with the sides of the meshes generally parallel to the cuspate grid (as shown in FIG. 1); in the preferred form of production used, this will mean that the non-shrink layer 2 will be termed a diamond mesh. This gives more pronounced troughing on shrinkage, even if the mesh sizes of the two plies are different, and it is believed that the strands swivel slightly to enable the pyramids of the cuspated structure to be formed. In addition, the fact that the strands are running parallel to the grid of the cuspated structure gives good crush resistance and a relatively stiff material. Though not illustrated, the non-shrink layer 2 could however have its strands running parallel to the diagonals of the cuspate grid, e.g. being of square or rectangular mesh on the production plant.

The non-shrink layer 2 may alternatively have the form of a trellis net (parallelogram mesh openings), or of double-laid plies of trellis net.

The non-shrink layer 2 shown is formed of a normal thermoplastics material, but it may be formed of a thermoplastic elastomer.

The layers 1,2 are fixed together while they are in substantially planar form. Although any suitable fixing can be used, it is generally preferred to use a material which enrobes the shrink layer 1 as this provides a locked seal (i.e. a fixing which prevents printing between the layers 1, 2 at the fixing zone) and causes a more regular cuspated form to be produced; the fixing can be by melt fusion and the subsequent solidifying of the material, e.g. by ultrasonic welding or hot melt printing, or preferably hot welding. It is important that the welding zone 3 should extend over enough strands to ensure fixing; as a result, though circular zones 3 can give good results (see FIG. 4), elongate zones 3 are preferred (see FIG. 4a) as they will extend over more than one strand but will not have a very large area because they are narrow. If the shrink layer 1 has its strands generally aligned with the diagonals of the cuspate grid, satisfactory structures can be formed if the gaps between the welding zones 3 in each row are approximately equal to the lengths of the welding zones 3 themselves. However, if the strands of the shrink layer 1 extend roughly parallel to the sides of the cuspate grid, it is preferred that the gaps should be substantially longer, the gaps being about double the lengths of the welding zones 3 or more specifically the welding zones 3 representing about 34% of the total length of the row.

The preferred mesh pitch for the shrink layer 1 is 3 to 15 mm and the preferred mesh pitch for the non-shrink layer 2 is 5 to 11 mm.

As shown in FIG. 2, there may be a third, non-shrink layer 5 on the other side of the first layer 1, which third layer 5 would normally be identical to the non-shrink layer 2 (though not necessarily so). The third layer 5 will also assume a cuspated form. It is also possible to put the shrink layer 1 on both sides of the non-shrink layer 2. The cuspated structure so formed would have less height as the non-shrink layer 2 is constricted and both faces would be nearly planar, but the structure could provide a good bond for woven or non-woven geotextiles filter materials on one or both faces, to form drainage structures.

FIG. 2 illustrates that at the selvedge, the shrink layer 1 can project e.g. 5 cms out beyond the non-shrink layers 2 and 5. This enables lengths of the structure to be sewn or fixed together side-by-side (in a sewing or welding machine) as the shrink layer 1 at the selvedges remains fairly flat. An alternative is just to have the fixing zones a suitable distance from the edges. Another alternative is just to compress the cuspations in the sewing or welding machine. Once side-by-side lengths have been joined together, they can be folded over down the sew lines.

Figure 6:
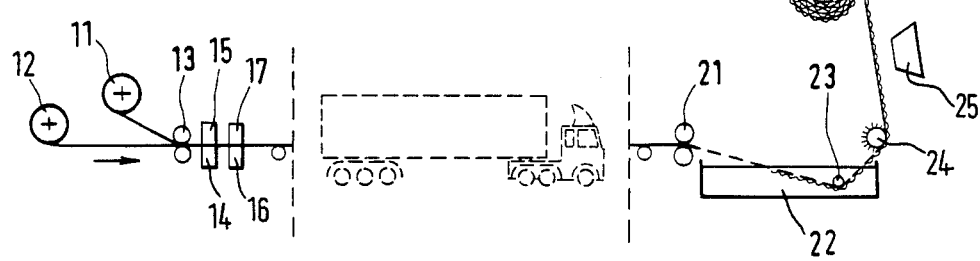
FIG. 6 is a schematic side view of plant for making the structure of FIG. 1.

Plant (FIG. 6)

FIG. 6 illustrates a manufacturing process for making the cuspated structures. The part between the vertical dashed lines may include an accumulator (for continuous manufacture), or may be represented by collecting the semi-finished product and securing it (e.g. by rolling it up tightly in a dense roll and strapping it), and either bulking it later on the same site or transporting it a long distance (represented by the schematic, smaller scale illustration of a truck) and then bulking it.

The initial part of the plant operates step-wise. Shrinkable and non-shrinkable materials are fed from rolls 11,12 respectively, united by nip rolls 13 and are fixed together by transversely-spaced welding tools 14 which cooperate with a heated or (preferably) unheated bar 15 or tools 15 of the same shape as the tools 14; the tools 15 are preferably temperature-controlled to a temperature below, say 10° C. below, that of the tools 14, and below the melt temperature of the non-shrink layer 12. As the tools 14 contact the non-shrink layer 12, the material in contact with the tools 14 melts and adheres to the shrink layer 11, preferably flowing and enrobing the shrink layer 11. On the next step forward, cold tools 16, similar in shape to the welding tools 14, hold the welding zones 3 against a second unheated bar 17 and prevent the layers pulling apart before the material has cooled. An alternative is to use cooperating soft rubber rolls instead of the tools 16 and the bar 17. Continuous systems are however possible, such as using welding heads cooperating with rollers or with transport chains.

In order to bulk up the structure, the structure is passed through the nip of input rolls 21, through a hot bath 22 containing water at 95°-100° C., under a bar 23 and under a stiff brush roll 24 which is geared to rolls 21 and determines the MD shrink; the roll 24 can have steel or nylon bristles. Though not shown, converging fine chains or belts can be used to predetermined TD shrinkage. A cold air blast may be applied by nozzles 25. As alternatives, hot air or infra-red can be used for shrinking, and the material may be on a continuously-moving conveyor.

Figure 7:
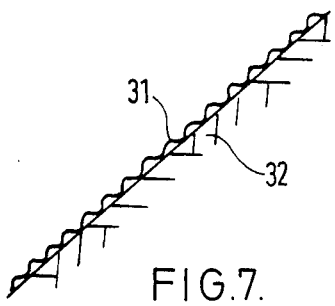
FIG. 7 is a schematic view of the structure of FIG. 1, in use as an enbankment stabiliser.
Figure 8:
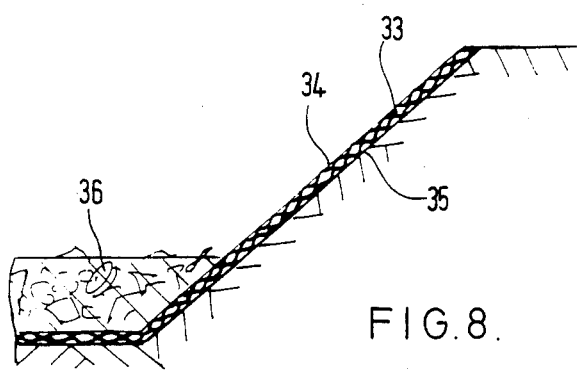
FIG. 8 is a schematic view of the structure of FIG. 1, in use as a drainage structure.

Uses (FIGS. 7 and 8)

There are many end uses for the structure, such as carpet underlay, mattresses and other cushioning applications, and side safety mats for the edges of swimming baths. However, the structures are primarily designed for geoengineering (geotechnical) use such as embankment stabilisation (FIG. 7) and drainage (FIG. 8). In FIG. 7, a single-sided structure 31 (as in FIG. 1) is laid on the bank 32 of a river or sea wall or road, with the cuspated layer 2 uppermost. The structure 31 is pegged down and fine soil and suitable seed are spread over the structure 31 so as to pass down into the intertices of the structure 31.

In FIG. 8, a double-sided structure 33 as in FIG. 2 has a geotextile 34 applied to the upper side and an imperforate plastics film 35 applied to the lower side—the geotextile 34 and film 35 may be applied and preferably attached during manufacture (after bulking). As an alternative, the geotextile 34 may be applied to the structure of FIG. 5. The material 33,34,35 is shown lining a pit containing refuse 36, for draining foul water from the refuse 36. In other applications, for instance as a vertical drainage core, geofabrics could be applied to each side of the structure 33.

EXAMPLE

A structure similar to that illustrated in FIG. 1 was made in the laboratory. The shrink layer 1 was formed of two plies; each ply is a linear low density polyethylene square mesh extruded as in GB No. 1 250 478 and each ply biaxially orientated by stretching 4:1 overall in both the MD and the TD at 60° C. In each ply there was a square mesh pitch of 7 to 8 mm, the weight being 38 g/m$^2$. The non-shrink layer 2 was formed of two plies; each ply is an unorientated low density polyethylene diamond mesh with equal diagonal pitches of 11 mm. The weight of each ply was 135 g/m$^2$. Although in general terms the weight of the shrink layer 1 can be equal to or less than (or even more than) that of the non-shrink layer 2, in this case the weight of the shrink layer 1 before shrinkage was less than a third of the weight of the non-shrink layer 2.

The layers 1,2 were heat welded together using welding tools with rectangular faces, as in FIG. 4a; the tools contacting the shrink layer 1 were at a room temperature 10° C. less than the tools contacting the non-shrink layer 2. The welding zones were staggered in rows, each welding zone being 17 mm long and 6 mm wide, the pitching of the welding zones and of the rows being 50 mm and 25 mm respectively. The plastics of the non-shrink layer 2 melted in the welding zones and enrobed the strands of the shrink layer 1 to a certain extent in those zones.

The unbulked material had a weight of about 350 g/m$^2$ and a thickness of about 3 mm.

The structure was bulked by being passed through a water bath at 98° C. The shrink layer 1 shrank 16% in both MD and TD directions; the non-shrink layer 2 had substantially no shrinkage. The structure bulked to form a high-profile, regular, cuspated structure which had a weight of about 490 g/m² and a thickness of about 18 mm (taken as the thicknesses from the tops of the cusps). In general, it is preferred that the thickness of the structure should not be less than around 12 mm, but the maximum thickness could be considerable, say 30, 40 or 50 mm. As the maximum thickness of a bulked fabric is around 6 mm, and bulked fabrics are normally significantly thinner than 6 mm, the bulked structure of the invention can be considered as having a thickness of at least double that of a bulked fabric and in general terms around an order greater than that of a bulked fabric.

A test has been devised for ensuring that the bulked structure of the invention is capable of restraining soil movement. A 1 m×1 m square of the structure is secured to a base board. While the board is horizontal, aggregate of sieve size 3-6 mm is poured on the structure and is levelled off, and the dry weight of the aggregate noted. The board and structure are then tilted to 45°—some aggregate will fall off, but the loss should not be too great, say not more than 50% w/w. The dry weight of aggregate remaining is calculated. Using a weir, a flow of 22.5 liters per minute per meter width is distributed across the top of the structure and continued for five minutes. The aggregate washed out was dried and weighed. A substantial amount of aggregate should remain, say at least 50% w/w (of weight after tilting up) but preferably up to 80% w/w.

The test was carried out on the bulked structure of the Example above, but made using circular welding zones 3 (FIG. 4); it is believed that the results for the Example strictly as described, would be very similar. 14.7 Kg/m² of aggregate was loaded on. On tilting, the load of aggregate reduced to 10.4 Kg/m² (29% loss); on flowing the water the load of aggregate was reduced to 8.5 Kg/m² (18% loss, of weight after tilting up).

A layer of filter material can be attached to one or both faces of the bulked structure, and/or an impervious layer attached to one face, for instance by glueing or hot melt printing or flame bonding.

In full scale production, as in the plant of FIG. 6, the layers 1, 2 can be continuous and of 3 m width.

The unbulked material can be bulked in the same manufacturing line. Alternatively, the material can be rolled into rolls each containing e.g. 100 m, and either bulked later on the same site or transported away for bulking elsewhere—before transporting, the material would be tied, strapped, packaged or containerised in order to secure it. By transporting before bulking, only about one-sixth of the bulked space is required.

The present invention has been described above purely by way of example. Modifications can be made within the scope of the invention.

We claim:

1. A method of making a high-profile structure comprising:
   providing a first, substantially planar, biaxially heat-shrinkable, plastics material layer, said first layer being of mesh structure defining generally square or rectangular meshes;
   providing a second, substantially planar, plastics material layer, said second layer being of mesh structure;
   fixing said first and second layers together at discrete zones which lie on intersections of a notional, generally square grid defining axes generally at right angles to each other, the sides of the meshes defined by said first layer being substantially parallel to diagonals of said grid, each said zone being spaced from adjacent said zones along each said axis of said grid, thereby forming a relatively dense, composite structure; and
   heating said relatively dense, composite structure to cause said first layer to shrink biaxially with respect to said second layer and cause said second layer to assume a fairly regular cuspated configuration.

2. The method of claim 1, wherein said mesh structure of said second layer defines generally square or rectangular meshes whose sides are generally parallel to said axes of said grid.

3. The method of claim 1, wherein said first layer is a mesh structure defined by mesh strands meeting at integral junctions or intersections.

4. The method of claim 1, wherein, after fixing said first and second layers together and before heating said composite structure to cause said second layer to assume a cuspate figuration, said relatively dense, composite structure is transported by vehicle.

5. The method of claim 1, wherein said first layer comprises a first ply and a second ply, each said ply being formed of a mesh structure comprising a first set of strands and a second set of strands which makes an angle which is a small amount less than 90° to said first set, said first set of said first ply being substantially parallel to said first set of said second ply and said small amount in respect of said second set of said first ply being in the opposite direction to that of said second set of said second ply.

6. The method of claim 1, wherein after said heating to form said cuspations, a further layer is attached to one or both faces of said high-profile structure.

7. The method of claim 1, wherein said mesh structure of said second layer defines generally square or rectangular meshes whose sides are generally parallel to said axes of said grid.

8. The method of claim 1, wherein said second layer is a composite and formed of at least two plies of mesh structure.

9. The method of claim 1, wherein said second layer does not shrink substantially during said heating.

10. The method of claim 1, wherein said fixing is performed by a material which enrobes parts of said first layer at said fixing zones.

11. The method of claim 1, wherein said fixing is performed by heat fusion and the subsequent hardening of melted material.

12. The method of claim 11, wherein said fixing is performed by heat welding, heated tools being applied to said second layer whilst said first layer is supported by at least one surface at a lower temperature than said tools.

13. The method of claim 1, wherein a third layer is fixed to said first and second layers, forming a material with alternate layers which shrink and do not shrink during said heating.

14. The method of claim 13, wherein said third layer is on the other side of said first layer to said second layer, said third layer being substantially planar and of plastics material mesh structure, said first layer shrinking biaxially with respect to said second layer and with respect to said third layer during said heating whereby said third layer also forms a fairly regular cuspated configuration.

15. A method of making a high-profile structure comprising:
- providing a first, substantially planar, biaxially heat-shrinkable, plastics material layer;
- providing a second, substantially planar, plastics material layer, said second layer being of mesh structure defining generally square or rectangular meshes;
- fixing said first and second layers together at discrete zones which lie on intersections of a notional, generally square grid defining axes generally at right angles to each other, the sides of the meshes defined by said second layer being generally parallel to said axes, each said zone being spaced from adjacent said zones along each said axis of said grid, thereby forming a relatively dense, composite structure; and
- heating said relatively dense, composite structure to cause said first layer to shrink biaxially with respect to said second layer and cause said second layer to assume a fairly regular cuspated configuration.

16. The method of claim 15, wherein said first layer is a mesh structure.

17. The method of claim 15, wherein said first layer is substantially imperforate.

18. The method of claim 15, wherein said second layer is composite and formed of at least two plies of mesh structure.

19. The method of claim 15, wherein after fixing said first and second layers together and before heating said composite structure to cause said second layer to assume a cuspated figuration, said relatively dense, composite structure is transported by vehicle.

20. A method of making a high-profile structure comprising:
- providing a first, substantially planar, biaxially heat-shrinkable, plastics material layer;
- providing a second, substantially planar, plastics material layer, said second layer being composite and formed of at least two plies of mesh structure;
- fixing said first and second layers together at discrete zones which lie on intersections of a notional, generally square grid defining axes generally at right angles to each other, each said zone being spaced from adjacent said zones along each said axis of said grid, thereby forming a relatively dense, composite structure; and
- heating said relatively dense, composite structure to cause said first layer to shrink biaxially with respect to said second layer and cause said second layer to assume a fairly regular cuspated configuration.

21. The method of claim 20, wherein said first layer is a mesh structure.

22. The method of claim 20, wherein said first layer is substantially imperforate.

23. The method of claim 20, wherein, after fixing said first and second layer together and before heating said composite structure to cause said second layer to assume a cuspated figuration, said relatively dense, composite structure is transported by vehicle.

* * * * *